(12) United States Patent
Fioravanti et al.

(10) Patent No.: US 10,768,579 B2
(45) Date of Patent: Sep. 8, 2020

(54) TIMER DEVICE AND METHOD FOR OPERATING SAID TIMER DEVICE

(71) Applicant: ZOBELE HOLDING SPA, Trento (IT)

(72) Inventors: Emilio Fioravanti, Trento (IT); Alessio Giovanelli, Trento (IT)

(73) Assignee: ZOBELE HOLDING SPA (IT)

( * ) Notice: Subject to any disclaimer, the term of this patent is extended or adjusted under 35 U.S.C. 154(b) by 0 days.

(21) Appl. No.: 15/537,500

(22) PCT Filed: Dec. 19, 2014

(86) PCT No.: PCT/EP2014/078692
§ 371 (c)(1),
(2) Date: Jun. 19, 2017

(87) PCT Pub. No.: WO2016/096034
PCT Pub. Date: Jun. 23, 2016

(65) Prior Publication Data
US 2017/0351222 A1 Dec. 7, 2017

(51) Int. Cl.
*G04F 1/00* (2006.01)
*G06F 11/07* (2006.01)

(52) U.S. Cl.
CPC .......... *G04F 1/005* (2013.01); *G06F 11/0706* (2013.01); *G06F 11/0757* (2013.01)

(58) Field of Classification Search
CPC ... G04F 1/005; G04F 1/00; A61L 9/04; G04C 23/42; G06F 11/0706; G06F 11/0757
See application file for complete search history.

(56) References Cited

U.S. PATENT DOCUMENTS

| | | | | |
|---|---|---|---|---|
| 4,490,711 A | * | 12/1984 | Johnston | A61J 7/04 340/309.4 |
| 6,644,507 B2 | * | 11/2003 | Borut | A61L 9/12 222/37 |
| 7,663,977 B1 | * | 2/2010 | Hartelius | G04F 1/005 221/24 |
| 7,774,648 B2 | * | 8/2010 | Majewski | G06F 11/0757 714/23 |
| 7,898,407 B2 | | 3/2011 | Hufton et al. | 340/539.11 |
| 7,993,055 B2 | * | 8/2011 | Nurse | G04G 13/026 368/244 |

(Continued)

OTHER PUBLICATIONS

Trader Joes Trader Jacques French Liquid Orange Blossom Honey Hand and Body Soap—amazon.com—Sep. 10, 2018.*

(Continued)

*Primary Examiner* — Sean Kayes
(74) *Attorney, Agent, or Firm* — Ostrolenk Faber LLP

(57) ABSTRACT

A timer device comprising a first timer in communication with control means, the control means being in communication with an external component and the first timer sending an order to the control means after a first preset time period is counted by the first timer, the timer device also comprising a second timer in communication with the control means, the second timer counting a second preset time period that is a portion of the first preset time period. The timer device permits an accurate operation, even with changes of temperature and voltage, and with a reduced cost.

5 Claims, 1 Drawing Sheet

(56) References Cited

U.S. PATENT DOCUMENTS

| | | | | |
|---|---|---|---|---|
| 8,813,999 B2* | 8/2014 | Cittadino | ............. | A47K 5/1217 |
| | | | | 222/1 |
| 8,857,662 B2* | 10/2014 | Hoppe | ................. | A01M 1/026 |
| | | | | 222/1 |
| 2008/0276132 A1 | 11/2008 | Majewski et al. | .............. | 714/55 |
| 2009/0254770 A1* | 10/2009 | Sipinski | ................... | G06F 1/24 |
| | | | | 713/323 |
| 2013/0018506 A1 | 1/2013 | Cittadino | ...................... | 700/240 |

OTHER PUBLICATIONS

International Search Report dated Sep. 7, 2015 in corresponding PCT International Application No. PCT/EP2014/078692.
Written Opinion dated Sep. 7, 2015 in corresponding PCT International Application No. PCT/EP2014/078692.

* cited by examiner

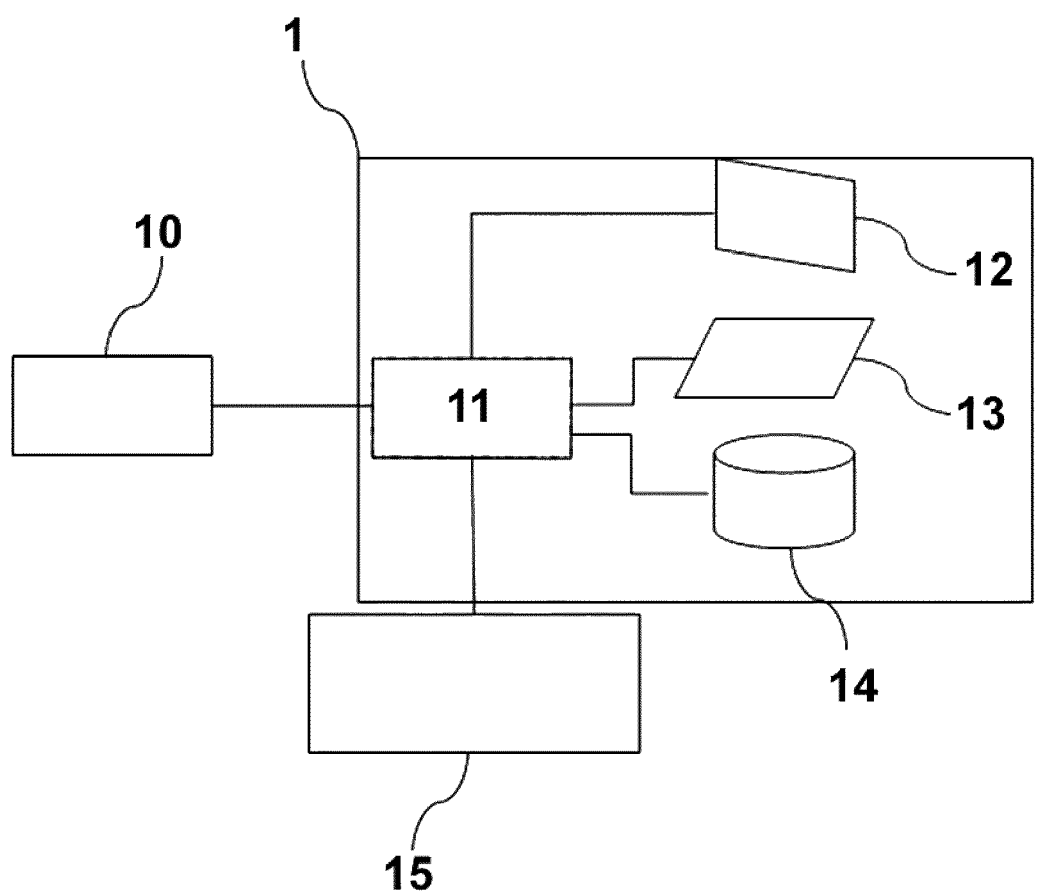

TIMER DEVICE AND METHOD FOR OPERATING SAID TIMER DEVICE

CROSS-REFERENCE TO A RELATED APPLICATION

The present application is a 35 U.S.C. §§ 371 national phase conversion of PCT/EP2014/078692, filed Dec. 19, 2014, the content of which are incorporated herein by reference. The PCT International Application was published in the English language.

TECHNICAL FIELD

The present invention refers to a timer device and to a method for operating said timer device.

BACKGROUND OF THE INVENTION

The timer devices based on microprocessors or microcontrollers are used to control a huge number of electronic and electromechanical devices in a wide range of environmental and temperature conditions, using different power supply methods, from a very stable power supply until batteries.

The main problem to solve for the development of low cost battery powered devices, including fragrance, soap and insecticide dispensers with a timer device comprising one control unit is the consumption control.

A typical method used is to place a control unit in sleeping mode when it is not used, and periodically in an awakening mode in order to allow it to check for some scheduled activities.

The sleep mode reduces the activity of the control unit and its related consumptions near zero. This awakening mode can be accomplished using a particular timer present inside the control unit, and if it is not cleared before it expires, resets the control unit.

However, in these timer devices there are two problems that reduce the timing precision: the voltage and temperature variations affect the accuracy of the internal timers of the control unit, with a consequently variation of the timing generated by them, and the timer usually used is less accurate than other timers.

Since the timing generation is one of the keys of any control system, the accuracy used to accomplish them is essential for a correct operation of the timer device.

Alternative solutions, useful for low cost devices and able to produce an adequately timing require a circuitry external to the control unit. This circuitry increases the cost and complexity of the device, and reduces the number of the available ports on the control unit, normally reduced in the low cost control units.

Therefore, it is evident the need of a timer device and method that permits an accurate operation, even with changes of temperature and voltage and with a reduced cost.

DESCRIPTION OF THE INVENTION

With the timer device and the method according to the invention said drawbacks can be solved, presenting other advantages that will be described hereinafter.

The timer device according to the present invention comprises a first timer in communication with control means, said control means being in communication with an external component and said first timer sending an order to the control means after a first preset time period is counted by the first timer, and it is characterized in that the timer device also comprises a second timer in communication with said control means, said second timer counting a second preset time period that is a portion of said first preset time period.

According to a preferred embodiment, said first timer is a watchdog timer.

Furthermore, the timer device according to the present invention preferably also comprises a memory in communication with the control means, which memory acts as a counter and is incremented each time the second time period counted by the second timer expires.

Advantageously, said first and second timers are placed inside the timer device, i.e. the second timer is not independent from the timer device.

According to second aspect, the present invention also refers to a method for operating the timer device as described previously, and it comprises the following steps:
  set a first time period to be counted by a first timer;
  set a second time period to be counted by a second timer, said second time period being a portion of the first time period;
  when said second time period is expired, but said first time period is not expired, the second timer begins again the measure of the second time period; and
  when said second time period is expired and said first time period is also expired, control means of the timer device are reset, and a component connected with the timer device starts an operation cycle.

In the method according to the present invention, preferably when the second time period is expired but the first time period is not expired, the value of a memory is incremented, and when said second time period is expired and said first time period is also expired the value of the memory is read and it is used to calculate a new time base, which is used as the first time period for the next operation cycle.

According to the present invention, it is provided a timer device and method that permits an accurate operation, even with changes of temperature and voltage and with a reduced cost.

BRIEF DESCRIPTION OF THE DRAWINGS

For a better understanding of what has been disclosed, some drawings are attached in which, diagrammatically and only as a non-limitative example a specific embodiment is shown.

FIG. 1 is a block diagram of the timer device according to the present invention.

DESCRIPTION OF A PREFERRED EMBODIMENT

FIG. 1 shows a block diagram of the timer device 1 according to the present invention, comprising a first timer 12, preferably a watchdog timer, in communication with control means 11, said control means 11 being in communication with an external component 15 and said first timer 12 sends an order to the control means 11 after a first preset time period is counted by the first timer 12. It must be pointed out that the control means 11 are fed by a power source 10.

The timer device according to the invention also comprises a second timer 13 in communication with said control means 11, said second timer 13 counting a second preset time period that is a portion of said first preset time period.

The timer device according to the invention also comprises a memory 14 in communication with the control means 11, which memory 14 acts as a counter and is incremented each time the second time period counted by the second timer 13 expires, as will be explained hereinafter.

As shown in FIG. 1, said first 12 and second 13 timers are placed inside the timer device 1, so that the second timer 13 is not an external element.

Firstly, it must be pointed out that "operation cycle" is considered all activities done by the control means 11 in order to follow what the software requires for the component 15. If the component 15 is a fragrance dispenser, the normal operations are the temporized activation/deactivation of the heater or fan, the led blinks, checking for the button activation and change the device status consequently, and so on.

The method according to the invention comprises the following steps:

set a first time period to be counted by a first timer 12 and a second time period to be counted by a second timer 13, said second time period being a portion of the first time period;

when said second time period is expired, but said first time period is not expired, the second timer 13 begins again the measure of the second time period; and when said second time period is expired and said first time period is also expired, control means 11 of the timer device are reset, and a component 15 connected with the timer device 1 starts a new operation cycle.

Preferably, when the second time period is expired but the first time period is not expired, the value of a memory 14 is incremented, and when said second time period is expired and said first time period is also expired the value of the memory 14 is read and it is used to calculate a new time base, which is used as the first time period for the next operation cycle.

One example of a component is a fragrance dispenser, in which an operation cycle is defined and which is repeated cyclically, for example activating a heater or fan for dispensing the fragrance and then deactivating said heater or fan.

In this case, the first time period can be of 10 seconds, which will be counted by the first timer 12 and the second time period can be 500 milliseconds, which will be counted by the second timer 13.

When the first 500 milliseconds are counted by the second timer 13 and the second time period is the count of the memory 14, originally 0, will be increased by 1, because the first time period will not be expired.

This count of the second time period will be repeated 20 times, until the expiration of the first time period, 10 seconds after. At this time, the control means 11 will be reset, the value of the memory (in this case 20) will be read, and this value will be used as a basis for calculating a new time base, which will be used as the first time period for the next operation cycle.

Even though reference is made to a specific embodiment of the invention, it is apparent for a person skilled in the art that the timer device and the method are susceptible of numerous variations and modifications, and all the details cited can be substituted by other technically equivalent ones, without departing from the scope of protection defined by the attached claims.

The invention claimed is:

1. A fragrance dispenser comprising:
a timer device comprising a first timer in communication with a controller;
said controller being in communication with a fragrance dispenser unit of the fragrance dispenser;
said first timer sending an order to the controller after a first preset time period is counted by the first timer;
the timer device further comprising a second timer in communication with said controller, said second timer counting a second preset time period, wherein the second preset time period is shorter than said first preset time period and is a portion of said first preset time period,
wherein when said second time period is expired and said first time period is also expired, said controller is reset, and the fragrance dispenser unit starts a new operation cycle,
wherein when the second time period is expired but the first time period is not expired, the value in a memory is incremented, and the second timer is immediately restarted to run from zero for the second preset time period;
when said second time period is expired and said first time period is also expired, the value in the memory is read and is used to calculate a new time base, and
wherein the new time base is used as the first time period for a next operation cycle of the fragrance dispenser unit.

2. The fragrance dispenser according to claim 1, wherein said first timer is a watchdog timer.

3. The fragrance dispenser according to claim 1, wherein the fragrance dispenser further comprises:
a memory in communication with the controller,
wherein said memory acts as a counter and is incremented each time the second time period counted by the second timer expires.

4. The fragrance dispenser according to claim 1, wherein said first and second timers are placed inside the timer device.

5. A method for operating the fragrance dispenser, the method comprising:
setting a first time period to be counted by a first timer;
setting a second time period to be counted by a second timer, wherein said second time period is shorter than said first preset time period and is a portion of the first time period;
when said second time period is expired, but said first time period is not expired, the second timer beginning again the measure of the second time period; and
when said second time period is expired and said first time period is also expired, resetting a controller, and starting a new operation cycle of the fragrance dispenser,
wherein when the second time period is expired but the first time period is not expired, incrementing a value in a memory, and the second timer is immediately restarted to run from zero for the second preset time period;
when said second time period is expired and said first time period is also expired, reading the value in the memory and using the value to calculate a new time base, and
wherein the new time base is used as the first time period for a next operation cycle of the fragrance dispenser unit.

* * * * *